Aug. 7, 1945.    A. LATHAM, JR    2,381,760
MEANS AND METHOD FOR SUPPLYING CLARIFIED LIQUID
Filed Jan. 27, 1943
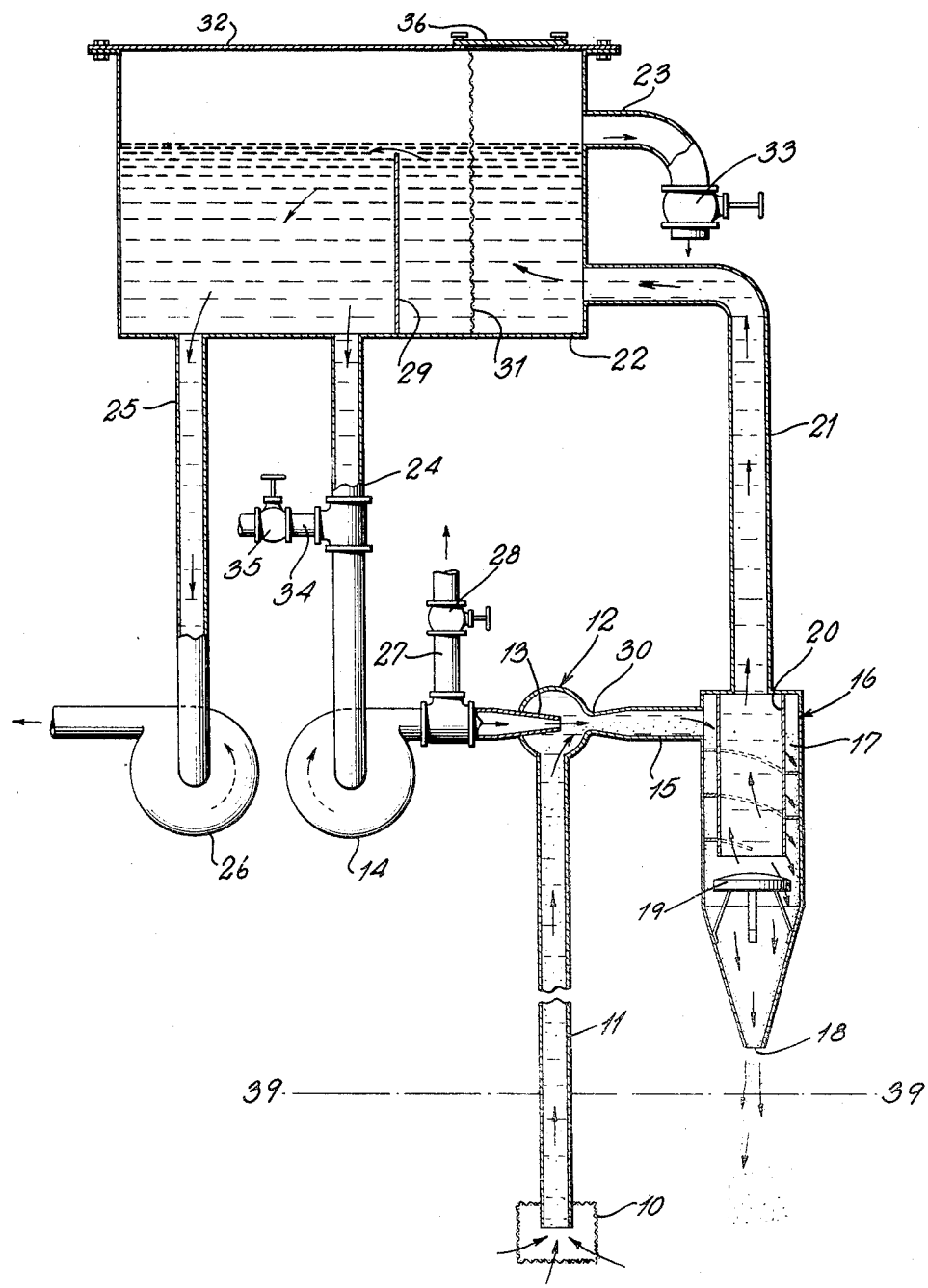
INVENTOR
Allen Latham, Jr.,
BY
Kenyon & Kenyon
ATTORNEYS Patented Aug. 7, 1945

2,381,760

UNITED STATES PATENT OFFICE 2,381,760

MEANS AND METHOD FOR SUPPLYING CLARIFIED LIQUID

Allen Latham, Jr., Jamaica Plain, Mass., assignor to Arthur D. Little, Inc., Cambridge, Mass., a corporation of Massachusetts Application January 27, 1943, Serial No. 473,716

7 Claims. (Cl. 210—52)

This invention relates to liquid supplying means. It is a purpose of this invention to provide liquid supplying means which is adapted to separate removable solids from liquid and furnish a supply of clarified liquid from which the solids have been separated. By way of example, this invention is highly advantageous in supplying water or other liquid taken from a source contaminated with solids to a distillation unit, boiler or the like so that the liquid will be supplied in a clarified condition. More generally, this invention is of utility whenever it is desired to obtain a supply of clarified liquid from a source that is contaminated with solid matter.

When a liquid source is contaminated with solids, the presence of solids in the liquid being supplied is very objectionable both because the solids cause formation of deposits in equipment using the contaminated liquid and because the solids are injurious to moving parts of such equipment, e. g., pumping units and the like. The occurrence of difficulties of the character mentioned may be illustrated in connection with the operation of distillation equipment designed for the recovery of potable water from sea water. Such distillation units frequently have to be located where there is a considerable amount of sand in the water supply; for example, when the liquid intake is located in the surf where the turbulence of the water causes a considerable amount of sand to be suspended in the water at the region of the intake. Under such conditions, the ordinary pumping equipment fails in operation due to abrasive action of the sand taken into the system. Moreover, the sand tends to accumulate in the system at an excessively rapid rate. The liquid supplying means of this invention is of particular utility for use under conditions such as those above described, namely, where the liquid from a liquid source contains solid particles, e. g., sand, which it is desirable to remove before the contaminating solids reach pumping equipment or the like or reach an evaporation or distillation zone. When reference is made herein and in the claims to solid particles which are "removable," the term "removable" is used in a broad sense as referring to solid particles which are removable by settling, centrifugal action or the like, the term "removable" being used in order to distinguish from solids of very small particle size, for example, colloidal particles, which do not lend themselves to separation from the liquid in which they are carried by ordinary separating equipment and methods.

It is a feature of this invention that liquid supplying means is afforded which causes liquid from a liquid source that is contaminated with suspended solids to be clarified without contacting relatively movable mechanical parts. To this end, ejector means is utilized which causes liquid from the contaminated liquid source to become commingled with a stream of previously-clarified liquid. The liquid from the contaminated source together with the clarified liquid is taken to a liquid-solid separator. Part of the clarified liquid available at the liquid-solid separator is utilized to afford the stream which carries additional contaminated liquid to the separator while another part of the clarified liquid that is available at the liquid-solid separator is directed out of the system to provide the clarified liquid which is furnished by the system and which may be used as the feed for a distillation unit or for any other purpose. Other features of this invention relate to the liquid-solid separator means wherein the solids are continuously removed in a relatively small amount of liquid in which the solids become concentrated and to the employment of a reservoir, preferably provided with an overflow.

Further purposes, features and advantages of this invention will be apparent in connection with the following description of a typical embodiment of the present invention which is shown, merely for purposes of illustration, in the accompanying drawing, which is a side elevation partly in section of liquid supplying means embodying this invention.

Considering the device shown in the accompanying drawing for use in the clarification of sea water and in the supplying of sea water in clarified condition, e. g., to a distillation unit, the sea water is introduced into the system through line 11 which has a screen 10 on the inlet end thereof that serves to prevent large objects, such as stones, sticks, etc., from entering the line 11. The screen 10 does not serve, however, to prevent solids of smaller particle size, such as sand, mud and the like, from entering the line 11. The water is drawn into the line 11 by the action of the ejector means which is indicated generally by the reference character 12. The ejector means includes a jet 13 which is supplied with water by means of the pump 14 that forces the water through the jet 13. The water from the jet 13 passes through the constricted portion 30 of line 15 at high velocity, and, since the pressure of this region of the jet and restricted orifice where high velocity is maintained is reduced, the reduction in pressure causes the contaminated sea water to flow through line 11 toward the ejector means and to become commingled with the water discharged from the jet 13.

The water forced through the line 15 by the action of the ejector means enters the liquid-solid separator which is indicated generally by the reference character 16. The liquid-solid separator includes a helical passage 17 which causes the stream of contaminated water entering the liquid-solid separator to flow in a downward spiral path and in following this path the centrifugal action throws the contaminating solids against the cylindrical wall of the separator and causes them to become separated from the water. At the lower end of the helical passage 17, the solids which have become concentrated adjacent the side wall of the liquid-solid separator move downwardly by force of gravity along the inwardly tapering portion of the separator to the restricted outlet aperture 18 at the bottom of the separator. The outlet aperture 18 being of restricted size as compared with the line 15 which leads into the separator permits only a relatively small amount of the water entering the separator to escape through the outlet aperture and the solids which have been caused to become concentrated in the water escaping through the aperture 18 are removed from the system, leaving the remainder of the water in a clarified condition. Within the lower portion of the liquid-solid separator is a baffle 19 which assists in preventing any solids which accumulate in the lower portion of the liquid-solid separator from being carried upwardly through the inner chamber 20 of the liquid-solid separator.

The clarified water is taken from the inner chamber 20 of the liquid-solid separator by the line 21 to the reservoir 22. The reservoir 22 has an overflow line 23 and preferably includes a baffle 29 which serves to cause any entrained bubbles to escape to the surface of the reservoir before the clarified water is taken from the reservoir.

In order to supply the pump 14, which is part of the ejector means, a portion of the water from the reservoir 22 is withdrawn therefrom through the line 24 that directs clarified water from the reservoir 22 to the pump 14. Another portion of the water from the reservoir 22 is withdrawn through the line 25 to the pump 26 which serves to convey the clarified water out of the system; for example, to the feed of a distillation unit.

In the handling of sea water, a device such as that above described by way of illustration may, for example, be operated in the following manner:

1.1 units by volume of water are taken into the system through the line 11. One unit by volume of clarified water is withdrawn from the reservoir 22 and is pumped through the jet 13 of the ejector means. The contaminated water which is taken into the system becomes commingled with the water forced through the jet 13 and 2.1 parts by volume of water are carried into the liquid-solid separator 16. Through the aperture 18 at the bottom of the liquid-solid separator .1 unit by volume of water is taken out of the system together with the contaminating solid material. Therefore, 2 units by volume of clarified water pass from the liquid-solid separator to the reservoir 22. .1 unit by volume of water escapes from the reservoir through the overflow 23. As aforesaid, one unit by volume of clarified water is recirculated by being pumped through the jet 13. The remainder of the clarified water, namely, .9 unit by volume, may be taken from the system through line 25 by means of the pump 26, and constitutes the clarified liquid supplied by the system.

The foregoing description of the operation of the device shown in the drawing and described hereinabove is merely illustrative inasmuch as the operation of the device may be widely varied. For example, it is apparent that, if the withdrawal of liquid from the reservoir 22 through the line 25 is varied, the amount of overflow will correspondingly vary, assuming that the pump 14 is operated so as to force a constant supply of liquid through the jet 13. Maintenance of the overflow is desirable, but not essential, in obtaining a constant supply of clarified liquid furnished by the system. Moreover, depending upon the capacity of the ejector means, the capacity of the liquid-solid separator, and like factors, both the total and the relative quantities of liquid handled by the device and the different elements thereof, may be varied.

It is an advantage of the liquid supplying means of this invention that its operation may be instituted very readily. Thus, by pouring clean water into the reservoir, and starting the pumps 14 and 26, the apparatus may be brought into operation promptly even if it had been entirely empty.

It is apparent that the construction set forth in the drawing and hereinabove described is illustrative and is subject to variation within the scope of this invention. For example, if liquid is to be supplied by gravity, then the inclusion of the pump 26 in line 25 for removing clarified liquid from the system is not required. Moreover, it is not essential to employ the separate draw-off lines 24 and 25 for removing clarified liquid from the reservoir 22. For example, the clarified liquid in reservoir 22 can be removed therefrom using the single draw-off line 24 and, by providing the line 27 controlled by valve 28, the liquid impelled by the pump 14 can be divided into two streams, one stream leading to the jet 13 and the other stream being taken out of the system by line 27 as the clarified liquid supplied by the system. In such case, the draw-off line 25 can be omitted.

If desired, the clarified liquid from the liquid-solid separator may be caused to pass through a screen before it is pumped through the ejector means or withdrawn from the system. Thus, for example, a screen 31, which may, for example, be of the order of 100 to 200 mesh, may be placed in the reservoir 22 and disposed so that all liquid entering the reservoir 22 by line 21 will have to pass through the screen before being withdrawn from the reservoir 22 by either of lines 24 or 25. Such a screen may be employed as a precaution in the event that, due to the aperture 18 of the liquid-solid separator becoming clogged or for any other reason, solids should be carried up at any time into the reservoir 22. Also, the employment of such a screen enables one, if necessary or convenient, to prime the device using liquid that is contaminated with solids, the solids in the priming liquid being separated by the screen from the liquid withdrawn from the reservoir 22 by lines 24 or 25. In the device shown, the priming water could, for example, be supplied in the region to the right of the screen 31 so that any contaminating solids in the priming liquid would be separated by the screen. If desired, the screen 31 may be in any other suitable location or may be made readily removable for cleaning.

It is possible to modify the device as above described, by providing the reservoir 22 with an air-tight cover 32, and by providing the overflow line 23 with an adjustable valve 33 so that the reservoir 22 may be maintained under pressure as a result of the action of the injector means supplying liquid to the reservoir. In such case, the line 25 and pump 26 could be omitted and the clarified liquid could be withdrawn from the system through the line 34 controlled as by the valve 35 or by the cross-sectional flow capacity of the line 34 or some part thereof. In such case, the cover 32 could be provided with an opening that can be closed as by detachable closure 36 adapted for ready removal to permit priming of the device. When the device is not operated under pressure, the closure 36 or the entire cover 32 may be omitted, and the valve 33 and the line 34 and valve 35 may be omitted.

Other types of liquid-solid separator units may be used, although it is preferable to employ a liquid-solid separator unit which provides for a continuous discharge of liquid mixed with contaminating solids so that the separator unit may be operated continuously without the attention of an operator. It is preferable, but not necessary, to employ a liquid-solid separator wherein the separation of the solids from the liquid is assisted by centrifugal action although a simple gravity separator may be employed. It is preferable that the liquid-solid separator effect separation by difference in relative specific gravity of the liquid and solids, either centrifugally or by settling, but this is not essential. Furthermore, other arrangements whereby the clarified liquid is divided into two streams, one of which is recirculated through the jet of the ejector means and the other of which is taken from the system as the supply of clarified liquid furnished by the system, may be employed. Thus it is possible to direct clarified liquid directly from the liquid-solid separator to the pump 14, thereby eliminating the reservoir 22, part of the liquid impelled by pump 14 passing through jet 13 and the balance being taken from the system by the line 27. Moreover, even when a reservoir is employed, either or both of pump means 14 and 26 may be supplied directly from the liquid-solid separator with clarified liquid, the reservoir 22 in such case acting after the manner of a standpipe, preferably provided with an overflow. However, it is preferable to pass the clarified liquid recirculated through the jet means and/or taken from the system, through a reservoir wherein any entrained gases may be allowed to escape. With regard to the pump means employed, any conventional pumping device, of which many are known, may be used, but preferably the pump means is adapted to force a continuous supply of liquid through the jet means of the ejector. Suitable centrifugal pumps or fixed displacement pumps are well known.

With regard to the jet means employed for obtaining a rapidly moving stream, the jet means may take many different forms, the terms "jet" and "jet means" being used broadly herein and in the claims to refer to any means for causing a liquid under pressure to flow in a rapidly moving stream. The ejector means may be employed above, at, or below the normal liquid level (indicated by the line 39—39 in the drawing, namely, below the ejector means) of the contaminated source from which liquid containing removable solids is taken and various means may be employed whereby the contaminated liquid becomes commingled with the liquid forced through the jet means of the ejector. Moreover, it is apparent that, while this invention has been described and illustrated in connection with the clarification of sea water, other liquids may be treated for clarification according to this invention for the separation of removable solids therefrom. Accordingly, the scope of this invention is to be governed by the language of the following claims.

I claim:

1. Liquid supplying means adapted to supply clarified liquid from which removable solids have been separated, which comprises ejector means including jet means and pump means arranged to force liquid through said jet means, means for commingling liquid from a contaminated liquid source with liquid forced through said jet means by said pump means, a liquid-solid separator, means for directing liquid ejected from said jet means commingled with liquid from the contaminated liquid source from said ejector means to said liquid-solid separator, means for simultaneously withdrawing from said liquid-solid separator effluent liquid containing contaminating solids and effluent clarified liquid, a reservoir, means for directing said clarified liquid from said liquid-solid separator to said reservoir, means for directing clarified liquid from said reservoir to said pump means to be forced by said pump means through said jet means, and means for directing additional clarified liquid from said reservoir to provide the supply of clarified liquid furnished by said liquid supplying means.

2. Liquid supplying means adapted to supply clarified liquid from which removable solids have been separated, which comprises ejector means including a jet means and pump means arranged to force liquid through said jet means, means for directing liquid from a contaminated source to said ejector means and for commingling said liquid from said contaminated source with liquid ejected from said jet means, a liquid-solid separator, means for directing liquid ejected from said jet means commingled with liquid from said contaminated liquid source from said ejector means to said liquid-solid separator, a reservoir provided with inlet means and outlet means, means for directing clarified liquid from said liquid-solid separator to said inlet means of said reservoir, means for directing a portion of clarified liquid from said outlet means of said reservoir to said pump means to be forced through said jet means, and means for directing another portion of clarified liquid from said outlet means of said reservoir as the supply of clarified liquid furnished by said liquid supplying means, said reservoir being provided with overflow means and with baffle means disposed between said inlet means and said outlet means of said reservoir, and said liquid-solid separator being provided with a downwardly extending helical passage through which liquid entering said liquid-solid separator is directed to provide centrifugal separation of removable solids from liquid and which comprises baffle means of annular cross section extending downwardly from the top of said liquid-solid separator to the lower portion of said liquid-solid separator to form a chamber within said liquid-solid separator that is open at the bottom and is surrounded by said helical passage, said liquid-solid separator being provided below said chamber and below said helical passage with downwardly converging walls terminating in an aperture for the discharge of a portion of the liquid introduced into said liquid-solid separator together with contaminating solids separated from the bulk of the liquid in said separator and said liquid-solid separator being provided with an outlet adjacent the upper end thereof and communicating with said chamber through which the bulk of the liquid introduced into said liquid-solid separator is passed in clarified condition in being directed from said liquid-solid separator to said reservoir.

3. Liquid supplying means adapted to supply clarified liquid from which removable solids have been separated, which comprises ejector means including jet means and pump means arranged to force liquid through said jet means, means whereby liquid from a contaminated source becomes drawn into and commingled with liquid forced through said jet means by said pump means, a liquid-solid separator including tortuous passage means for directing liquid which has been forced through said jet means and which has been commingled with liquid from said contaminated source in a downward spiral path whereby removable solids are concentrated in a portion of said liquid by centrifugal action, first outlet means adjacent the bottom of said liquid-solid separator, means for directing removable solids concentrated by flow of said liquid through said tortuous passage means to said first outlet means, second outlet means adjacent the top of said liquid-solid separator which is of substantially greater flow capacity than said first outlet means, means for directing clarified liquid from said second outlet means of said liquid-solid separator to said pump means, means for simultaneously directing clarified liquid from said second outlet means of said liquid-solid separator to provide the supply of clarified liquid furnished by said liquid supplying means, and means for simultaneously directing from said first outlet means of said liquid-solid separator residual liquid mixed with removable solids separated from clarified liquid in said liquid-solid separator.

4. Liquid supplying means adapted to supply clarified liquid from which removable solids have been separated, which comprises ejector means including jet means and pump means arranged to force liquid through said jet means, means for commingling liquid from a contaminated source with liquid forced through said jet means by said pump means, a liquid-solid separator adapted to effect a concentration of solids contained in liquid introduced therein in one portion of liquid within the liquid-solid separator leaving the balance of the liquid within the liquid-solid separator clarified of said solids, means for directing liquid forced through said jet means commingled with liquid from said contaminated source to said liquid-solid separator, a reservoir, an overflow outlet for said reservoir, outlet means below the level of said overflow outlet of said reservoir for continuously directing a minor quantity of liquid from said liquid-solid separator in which removable solids separated from the balance of the liquid within said liquid-solid separator have been concentrated, conduit means connecting said liquid-solid separator with said reservoir and arranged below the level of said overflow outlet of said reservoir for directing clarified liquid from said liquid-solid separator to said reservoir, means below the level of said overflow outlet of said reservoir for continuously directing clarified liquid clarified in said liquid-solid separator to said pump means to be forced through said jet means, and means below the level of said overflow outlet of said reservoir for continuously directing additional liquid clarified in said liquid-solid separator out of the system to provide the supply of clarified liquid furnished by the said liquid supplying means.

5. A method of supplying clarified liquid taken from a liquid source containing removable solids which comprises forcibly ejecting clarified liquid to provide a liquid stream, commingling liquid from a contaminated liquid source with said stream of clarified liquid to provide a stream of commingled liquids, directing said stream of commingled liquids to a liquid-solid separator, continuously separating in said liquid-solid separator the bulk of the commingled liquids from removable solids contained therein by relative specific gravity to provide clarified liquid leaving the removable solids in a minor quantity of the liquid, continually removing said minor quantity of liquid containing the removable solids from the system, simultaneously and continually removing from said liquid-solid separator said clarified liquid and recirculating and forcibly ejecting same to provide said liquid stream, and removing additional liquid clarified as aforesaid from the system to provide the supply of clafified liquid furnished by the system.

6. A method according to claim 5 wherein the amount of liquid that is clarified as stated in said claim is maintained in excess of the amount of clarified liquid that is recirculated for forcible ejection plus the amount of clarified liquid removed from the system to provide the supply of clarified liquid that is furnished by the system, the excess clarified liquid being removed separately from the system at a point of overflow above said liquid-solid separator, thereby maintaining said liquid-solid separator under a substantially constant hydraulic head.

7. Liquid supply means adapted to continuously supply clarified liquid from which removable solids have been separated, which comprises ejector means including jet means and pump means arranged to continuously force liquid under pressure through said jet means, means for commingling liquid from a contaminated source with liquid forced through said jet means by said pump means to provide a continuous stream including the liquid ejected from said jet means and the contaminated liquid commingled therewith, a liquid-solid separator device provided with an inlet means and outlet means and provided with means for continuously dividing an incoming stream of liquid contaminated with solids into effluent streams, one of which is a stream of clarified liquid which flows out of one outlet and the other of which is a stream of liquid in which the concentration of solids is higher than in the incoming stream and which flows out of another outlet, means for continuously directing the liquid ejected from said jet as commingled with the contaminated liquid from said ejector means to the inlet of said liquid-solid separator device, means for continuously directing clarified liquid from the clarified liquid outlet of said liquid-solid separator device to said pump means to be forced through said jet means, means for directing additional clarified liquid from said liquid-solid separator device to provide the supply of clarified liquid furnished by the liquid-supplying means, and means for continuously directing from the contaminated-liquid outlet of said liquid-solid separator device the said effluent stream carrying contaminating solids.

ALLEN LATHAM, Jr.